United States Patent [19]

Coetzer et al.

[11] Patent Number: 5,403,676
[45] Date of Patent: Apr. 4, 1995

[54] ELECTROCHEMICAL CELL, METHOD OF MAKING SUCH AND PRECURSOR THEREFOR

[75] Inventors: Johan Coetzer, Pretoria; Isak L. Vlok, Verwoerdburg, both of South Africa

[73] Assignee: AABH Patent Holdings Societe Anonyme, Luxembourg, South Africa

[21] Appl. No.: 110,130

[22] Filed: Aug. 20, 1993

Related U.S. Application Data

[63] Continuation of Ser. No. 780,902, Oct. 23, 1991, abandoned.

[51] Int. Cl.⁶ .................... H01M 10/44; H01M 4/36
[52] U.S. Cl. ......................... 429/50; 429/103; 429/104
[58] Field of Search ............... 204/67, 68, 243 R, 245, 204/283; 429/103, 104, 50; C15C 3/00, 3/02; H01M 4/36, 4/38, 6/20

[56] References Cited

U.S. PATENT DOCUMENTS

| | | | |
|---|---|---|---|
| 4,529,676 | 7/1985 | Galloway et al. | 429/102 |
| 4,546,055 | 10/1985 | Coetzer et al. | 429/103 |
| 4,560,627 | 12/1985 | Bones et al. | 429/103 |
| 4,592,969 | 6/1986 | Coetzer et al. | 429/50 |
| 4,626,483 | 12/1986 | Bones et al. | 429/50 |
| 4,722,875 | 2/1988 | Wright | 429/103 |
| 4,772,449 | 9/1988 | Bones et al. | 419/2 |
| 4,797,333 | 1/1989 | Coetzer et al. | 429/103 |
| 4,846,943 | 7/1989 | Coetzer et al. | 204/61 |
| 4,975,343 | 12/1990 | Coetzer | 429/103 |
| 5,019,466 | 5/1991 | Coetzer et al. | 204/68 |
| 5,208,119 | 5/1993 | Ducan | 429/103 |
| 5,234,778 | 8/1993 | Wright | 429/103 |

FOREIGN PATENT DOCUMENTS

| | | |
|---|---|---|
| 2226692 | 7/1990 | United Kingdom . |
| 2227357 | 7/1990 | United Kingdom . |
| 2227357A | 7/1990 | United Kingdom . |

OTHER PUBLICATIONS

UK Search Report dated Dec. 12, 1991.

*Primary Examiner*—Kathryn Gorgos
*Attorney, Agent, or Firm*—Arnold, White & Durkee

[57] ABSTRACT

A method of making an electrochemical cell comprises loading into a cathode compartment of a cell housing comprising also an anode compartment containing at the operating temperature of the cell and when the cell is in its charged state, a molten alkali metal, M, anode, the anode compartment being separated from the cathode compartment by a suitable separator, a molten salt electrolyte having the formula $MAlHal_4$ wherein Hal is a halide other than Br; an active cathode substance which includes a transition metal T selected from the group comprising Fe, Ni, Co, Cr, Mn and mixtures thereof; an alkali metal halide MHal; and a minor proportion of MBr thereby to make an electrochemical cell precursor. The precursor is charged at a temperature at which the molten salt electrolyte and alkali metal M are molten, thereby to halogenate the active cathode substance, with alkali metal being produced and passing through the separator into the anode compartment.

19 Claims, 15 Drawing Sheets

ELECTROCHEMICAL CELL, METHOD OF MAKING SUCH AND PRECURSOR THEREFOR

This is a continuation of application Ser. No. 07/780,902, filed Oct. 23, 1991, now abandoned.

BACKGROUND OF THE INVENTION

This invention relates to an electrochemical cell. It relates also to a precursor to an electrochemical cell, to a method of making a precursor to an electrochemical cell, and to a method of making an electrochemical cell.

SUMMARY OF THE INVENTION

According to a first aspect of the invention, there is provided a method of making an electrochemical cell of the type comprising an anode compartment containing at the operating temperature of the cell and when the cell is in its charged state, a molten alkali metal anode, and a cathode compartment containing, at said operating temperature and when the cell is in its discharged state, an alkali metal aluminium halide molten salt electrolyte which is also molten at the operating temperature of the cell, and having the formula $MAlHal_4$, wherein M is the alkali metal of the anode, and Hal is a halide, the cathode compartment containing also a cathode which comprises an electronically conductive electrolyte-permeable matrix which has dispersed therein an active cathode substance which includes a transition metal T selected from the group comprising Fe, Ni, Co, Cr, Mn, and mixtures thereof, the matrix being impregnated with said electrolyte, and, separating the anode compartment from the cathode compartment, a separator which comprises a solid conductor of the ions of the alkali metal of the anode or a micromolecular sieve which contains said alkali metal sorbed therein, the method comprising loading into the cathode compartment of a cell housing comprising an anode compartment separated from a cathode compartment by a separator which is a-solid conductor of ions of alkali metal M or is a micromolecular sieve which contains alkali metal M sorbed therein, an alkali metal aluminium halide molten salt electrolyte having the formula $MAlHal_4$ wherein M is the alkali metal of the anode and Hal is a halide other than Br;

an active cathode substance which includes a transition metal T selected from the group comprising Fe, Ni, Co, Cr, Mn and mixtures thereof;

an alkali metal halide MHal wherein M and Hal are respectively the same alkali metal and halide as in the molten salt electrolyte; and a minor proportion of MBr where M is the same alkali metal as in the molten salt electrolyte, thereby to make an electrochemical cell precursor; and charging the precursor at a temperature at which the molten salt electrolyte and alkali metal M are molten, thereby to halogenate the active cathode substance, with alkali metal being produced and passing through the separator into the anode compartment, and the proportions of alkali metal halide MHal, molten salt electrolyte, and MBr loaded into the cathode compartment being selected so that when the cell is fully charged and all the available cathode substance has been halogenated, the proportion of alkali metal ions and aluminium ions is such that the solubility of the active cathode substance in the molten electrolyte is at or near its minimum.

According to a second aspect of the invention, there is provided a method of making a precursor to an electrochemical cell of the type comprising an anode compartment containing at the operating temperature of the cell and when the cell is in its charged state, a molten alkali metal anode, and a cathode compartment containing, at said operating temperature and when the cell is in its discharged state, an alkali metal aluminium halide molten salt electrolyte which is also molten at the operating temperature of the cell, and having the formula $MAlHal_4$, wherein M is the alkali metal of the anode, and Hal is a halide, the cathode compartment containing also a cathode which comprises an electronically conductive electrolyte-permeable matrix which has dispersed therein an active cathode substance which includes a transition metal T selected from the group comprising Fe, Ni, Co, Cr, Mn, and mixtures thereof, the matrix being impregnated with said electrolyte, and, separating the anode compartment from the cathode compartment, a separator which comprises a solid conductor of the ions of the alkali metal of the anode or a micromolecular sieve which contains said alkali metal sorbed therein, the method comprising loading into the cathode compartment of a cell housing comprising an anode compartment separated from a cathode compartment by a separator which is a solid conductor of ions of alkali metal M or is a micromolecular sieve which contains alkali metal M sorbed therein, an alkali metal aluminium halide molten salt electrolyte having the formula $MAlHal_4$ wherein M is the alkali metal of the anode and Hal is a halide other than Br;

an active cathode substance which includes a transition metal T selected from the group comprising Fe, Ni, Co, Cr, Mn and mixtures thereof;

an alkali metal halide MHal wherein M and Hal are respectively the same alkali metal and halide as in the molten salt electrolyte; and a minor proportion of MBr where M is the same alkali metal as in the molten salt electrolyte, thereby to make an electrochemical cell precursor which, when it is subjected to charging at a temperature at which the molten salt electrolyte and alkali metal M are molten, is transformed into an electrochemical cell in which the active cathode substance is halogenated and alkali metal is produced, with the alkali metal passing through the separator into the anode compartment, the proportions of alkali metal halide-MHal, molten salt electrolyte, and MBr loaded into the cathode compartment being selected so that when the cell is fully charged and all the available cathode substance has been halogenated, the proportion of alkali metal ions and aluminium ions is such that the solubility of the active cathode substance in the molten electrolyte is at or near its minimum.

The molar proportion or .ratio of alkali metal ions and aluminium ions in the electrolyte is preferably not less than one, to obtain said minimum solubility.

The alkali metal, M, may be sodium, with the separator being beta-alumina. However, in other embodiments of the invention, the alkali metal may instead be potassium or lithium, with the separator then being selected to be compatible therewith.

The halide may be chlorine, so that the alkali metal halide, MHal, is sodium chloride. The electrolyte may then be in the form of a sodium chloride-aluminium chloride mixture or in the form of the double salt, ie $NaAlCl_4$. However, the halide may instead be iodine, so that the alkali metal halide is then NaI, with the electrolyte being $NaAlI_4$.

MBr will then naturally be NaBr, and the proportion of NaBr in the liquid electrolyte may be between 1% and 20% on a molar basis, preferably between 2% and 15%, typically from 3% to 10%. The electrolyte thus includes a minor proportion of NaBr as dopant. This provides, for example, resistance stability on cell cycling.

The electrolyte should thus be selected so that, at all states of charge, the solubility therein of the active cathode substance is at a minimum. This is achieved when the electrolyte comprises a mixture of sodium halide and aluminium halide in a 1:1 mole ratio, with the molten salt being in the presence of at least some solid sodium chloride at all stages of charge, ie a neutral electrolyte. When a beta-alumina separator is used, the only alkali metal present should be the sodium as other alkali metals can adversely affect the beta-alumina, and said minor proportion of up to 20% on a molar basis of the electrolyte will be made up of sodium bromide. The proportion of sodium bromide will, however, be sufficiently low for the electrolyte to retain its essential character as a sodium aluminium chloride electrolyte. There must thus be enough sodium halide, as mentioned above, for some solid sodium halide to remain in the cathode compartment when the cell is fully charged, ie to maintain minimum solubility.

It will be appreciated that minor quantities of impurities may be tolerated in the electrolyte, ie substances which will ionize in the molten electrolyte to provide ions which affect the electrochemical action of the electrolyte, but the quantity of such impurities should be insufficient to alter the essential character of the electrolyte as a $MAlHal_4$ system as defined.

The method may include initially loading also some aluminium into the cathode compartment, with no sodium initially being present in the anode compartment. On subjecting the cell precursor to an initial charging, the aluminium reacts with the alkali metal halide MHal to produce further molten salt electrolyte and to form alkali metal M which passes through the separator into the anode compartment. Sufficient aluminium is then provided so that the initial reaction with the aluminium on charging provides the initial starting up amount of sodium in the anode compartment, with normal charge and discharge reactions of the cell between its fully charged and discharged states, in accordance with the following reaction thereafter taking place:

$$2M + THal_2 \rightarrow 2MHal + T \qquad (1)$$

The transition metal T of the active cathode substance may be a member of the group comprising Fe, Ni and mixtures thereof. When the transition metal is iron, the cathode may include a small proportion of nickel and/or a chalcogen, as dopant; and when the transition metal is nickel, the cathode may include a small proportion of iron and/or a chalcogen such as sulphur, as dopant.

In a particular version of the invention, the active cathode substance may be loaded into the cathode compartment in the form of an intermediate refractory hard metal compound of said transition metal T with at least one non-metal of the group consisting of C, Si, B, N, and P.

The active cathode substance and the alkali metal halide may be mixed together in particulate form to form a mixture, the mixture sintered to form the electrolyte-permeable matrix, the electrolyte doped with the MBr, and the matrix impregnated with the doped molten salt electrolyte prior to loading thereof into the cathode compartment.

When the transition metal is in the form of an intermediate refractory hard metal compound, the compound can be a carbide, eg iron, chromium or manganese carbide. In other embodiments, the compound may comprise a compound of at least one of the transition metals with a plurality of the non-metals, and/or a compound of a plurality of the transition metals with at least one of the non-metals. The compound may comprise another or second transition metal which is mixed or alloyed with the other or first transition metal. The second transition metal may constitute a minor proportion, eg less than 30%, of the alloy or mixture.

When the matrix comprises at least one intermediate refractory hard metal compound it is, once said electrolyte has been impregnated therein and the NaCl and NaBr incorporated therein, a cathode precursor which is coupled via the separator with the anode compartment and which becomes a cathode after it has been subjected to at least one charge cycle.

More specifically, forming the matrix may comprise sintering particles such as powders or fibres of the transition metal or intermediate refractory hard metal compound in a reducing atmosphere. Instead, forming the matrix may comprise forming a particulate mixture thereof with an organic binder, pressing the mixture into a unitary body, and cracking the binder by heating the mixture under vacuum at a temperature of 400° C., which is sufficient to pyrolyse the binder. For example, a carbide of the transition metal in question can be mixed with a small quantity of carbon-forming organic binder such as phenol formaldehyde resin, the resulting mix being pressed into an electrode shape, and the resin cracked in a vacuum at a temperature above 600° C. which temperature is selected to pyrolyse the binder to conductive carbon.

Incorporating the NaCl and NaBr into the matrix may be effected simultaneously with the formation of the matrix, the NaCl and NaBr in finely divided particulate form being dispersed into the particulate material from which the matrix is formed, prior to formation of the matrix. Instead, the NaCl and NaBr may be incorporated into the matrix by melting the electrolyte and suspending particulate NaCl and NaBr in finely divided form in the molten electrolyte, prior to impregnating the electrolyte into the matrix, and then impregnating the electrolyte together with the NaCl and NaBr suspended therein, into the matrix. In yet a further embodiment, the NaCl may be incorporated into the matrix simultaneously with formation of the matrix as hereinbefore described, with the NaBr being incorporated therein by suspending it in the molten electrolyte, as also hereinbefore described.

It is thus apparent from the aforegoing that the NaCl and NaBr may be incorporated into the matrix in any one of a number of suitable different ways.

In another more specific version of the invention, the NaCl and NaBr may be combined by forming a mixture in particulate form of the NaCl and NaBr. Still more particularly, the formation of the mixture may comprise mixing together NaCl and NaBr powders.

Impregnating the molten salt electrolyte into the matrix may be by means of vacuum impregnation with the electrolyte in the molten state.

The powder mixture may then be impregnated, for example saturated, with the electrolyte, which may be effected simply by wetting the mixture with the electrolyte in molten liquid form, for example after the powder mixture has been packed, for example by tamping, into the cathode compartment. This will, in effect, provide a cathode precursor in discharged state, which can then be activated by charging.

In the charging reaction of this precursor, the metal component of the mixture is halogenated, sodium being produced during the halogenation, which sodium moves through the separator in ionic form, into the anode compartment where it exists in the charged or partially charged cell as molten sodium metal, electrons passing during the charging along the external circuit from the cathode compartment to the anode compartment.

Although the powder mixture may be charged in powder form after saturation with liquid electrolyte, the method may include as hereinbefore described, the additional step of sintering the powder mix to form a macroporous electrolyte permeable matrix prior to saturation with electrolyte, and activation by taking it through one or more charge cycles as a cathode to halogenate it.

The invention extends also to an electrochemical cell, when made according to the method, as hereinbefore described.

The invention extends further to a precursor to an electrochemical cell, when made according to the method as hereinbefore described.

According to a third aspect of the invention, there is provided a precursor for a high temperature electrochemical cell which comprises a cell housing having an anode compartment and a cathode compartment separated from each other by a separator which comprises a solid conductor of ions of an alkali metal M or a micromolecular sieve which contains alkali metal M sorbed therein, the cathode compartment containing an alkali metal aluminium halide molten salt electrolyte having the formula $MAlHal_4$ wherein M is the alkali metal of the separator and Hal is a halide other than Br;

a cathode which comprises an active cathode substance which includes a transition metal T selected from the group comprising Fe, Ni, Co, Cr, Mn and mixtures thereof;

an alkali metal halide MHal wherein M is the alkali metal of the separator and Hal is the halide of the molten salt electrolyte; and a minor proportion of MBr wherein M is the alkali metal of the separator, with the precursor being chargeable at a temperature at which the molten salt electrolyte and alkali metal M are molten to cause the active cathode substance to be halogenated, with alkali metal M being produced and passing through the separator into the anode compartment, and with the proportions of alkali metal halide MHal, MBr and molten salt electrolyte being selected so that when the cell is fully charged and all the available active cathode substance has been halogenated, the proportion of alkali metal ions and aluminium ions in the electrolyte is such that the solubility of the active cathode substance in the molten electrolyte is at or near its minimum.

As mentioned hereinbefore, the active cathode substance, the alkali metal halide and the MBr may be in particulate form with the alkali metal halide and MBr being mixed with the active cathode substance, and the mixture being impregnated with the molten salt electrolyte.

In another embodiment of the invention, the cathode may comprise an electronically conductive electrolyte-permeable matrix in which the active cathode substance, alkali metal halide and MBr are dispersed, with the matrix being impregnated with the molten salt electrolyte.

In yet another embodiment of the invention, the cathode of the cell may comprise an electronically conductive electrolyte-permeable microscopically porous matrix having a chlorinated nickel-containing active cathode substance dispersed therein, and the electrolyte and/or active cathode substance containing a minor proportion of a suitable chalcogen dispersed therein for resisting a progressive drop in the capacity of the cathode with repeated charge/discharge cycling thereof.

The substance may include $NiCl_2$ itself, one or more compounds of nickel which have been chlorinated, or combinations thereof. In a particular embodiment, the matrix itself may comprise nickel with the substance comprising $NiCl_2$. Instead, the matrix may comprise a material which does not contain nickel, the substance then comprising an intermediate refractory hard metal compound of nickel, such as a phosphite, boride or silicide thereof, which has been activated by halogenation.

When the cathode includes iron as a transition metal in conjunction with the beta-alumina solid electrolyte or separator, it may also include a protective cathode substance which oxidizes by chlorination at a voltage less than the open circuit voltage of the $Fe/FeCl_3//Na$ plateau, and greater than the open circuit voltage of the cathode in its fully charged state when coupled with the sodium anode. This is required to prevent or inhibit formation of free $FeCl_3$, which would poison the beta-alumina, hence resulting in the cell resistance increasing.

The cathode may comprise $Fe/FeCl_2$ as an active cathode substance dispersed in the matrix, the protective cathode substance oxidizing by chlorination at a voltage greater than the open circuit voltage of the $Fe/FeCl_2//Na$ plateau.

The protective cathode substance may be dispersed in finely divided form through the cathode, and the protective cathode substance may be selected from the group consisting in $Ni/NiCl_2$, $Co/CoCl_2$ and combinations of $Ni/NiCl_2$ and $Co/CoCl_2$.

When the separator is a micromolecular sieve, it may be a tectosilicate, eg a felspar, felspethoid or zeolite. When it is a zeolite, the zeolite may be a synthetic zeolite such as zeolite 3A, 4A, 13X or the like. Preferably, however, the separator is a solid conductor of sodium ions such as beta-alumina or nasicon. For example, a beta-alumina tube can be used. The interior of the tube may be used as the anode compartment, with the tube being located in a cell housing which defines a cathode compartment outside the tube, in the interior of the housing, and with an anode compartment current collector being in intimate electrical contact with substantially the entire separator. The tube will be sealed and may be evacuated prior to charging to resist undesirable pressure build-up therein as sodium moves into the anode compartment during charging, through the tube wall. In this specification, beta-alumina is used broadly, to include all phases of sodium ion conducting beta-alumina, such as beta"-alumina.

To spread the sodium over the inside of the tube wall and to effect said intimate contact of the anode compartment current collector with the separator, suitable wicking material, electrically connected to the current collector and containing finely divided electrically conductive particles, may be spread over the wall surface. The material may, for example, be iron mesh, optionally tinned. This mesh, hence, acts as a part of an anode current collector, and may be attached to an evacuation pipe of the same metal, used to evacuate the tube interior prior to charging and projecting out of the cell to form the remainder of the anode current collector.

The main current collector of the cathode of the cell of the present invention will usually be the housing itself which may be a metal such as the metals employed in the cathode powder combination or mixture. In this case, the housing may be the same metal as that of the powder mixture, or one with a higher charging potential, so that it remains metallic at all times. To improve the initial activation or charging characteristics of the cell, the cathode current collector may include a metal mesh or gauze connected, for example by welding, to the housing.

For close packing in batteries, the cell may have an elongate rectangular housing along the interior of which the tube extends in a more or less central position. To facilitate wicking in the anode compartment, the cell may be used horizontally, but this can lead to voids in the cathode compartment formed upon charging as the sodium moves into the anode compartment. For this reason, the cell may incorporate an electrolyte reservoir, more or less separate from but in communication with the cathode compartment, from which the electrolytes can pass, for example by draining under gravity, into the cathode compartment to keep it flooded with liquid electrolyte at all times. Naturally, for close packing, cells of similar construction but having an hexagonal cross-section can be employed instead.

As mentioned hereinbefore, the liquid electrolyte and/or active cathode substance may contain a minor proportion of a suitable chalcogen dispersed therein for resisting a progressive drop in the capacity of the cathode with repeated charge/discharge cycling of the cell, when the cathode contains, in the matrix, a chlorinated nickel-containing substance dispersed therein as the active cathode substance.

The chalcogen may comprise one or more species, such as selenium or sulphur, or compounds containing sulphur such as a transition metal sulphide. The chalcogen is preferably in extremely finely divided form, and it or reaction products between it and components of the liquid electrolyte may even be dissolved in the electrolyte.

The invention will now be described, by way example, with reference to the accompanying drawings.

DESCRIPTION OF THE PREFERRED EMBODIMENTS

Figure 1:
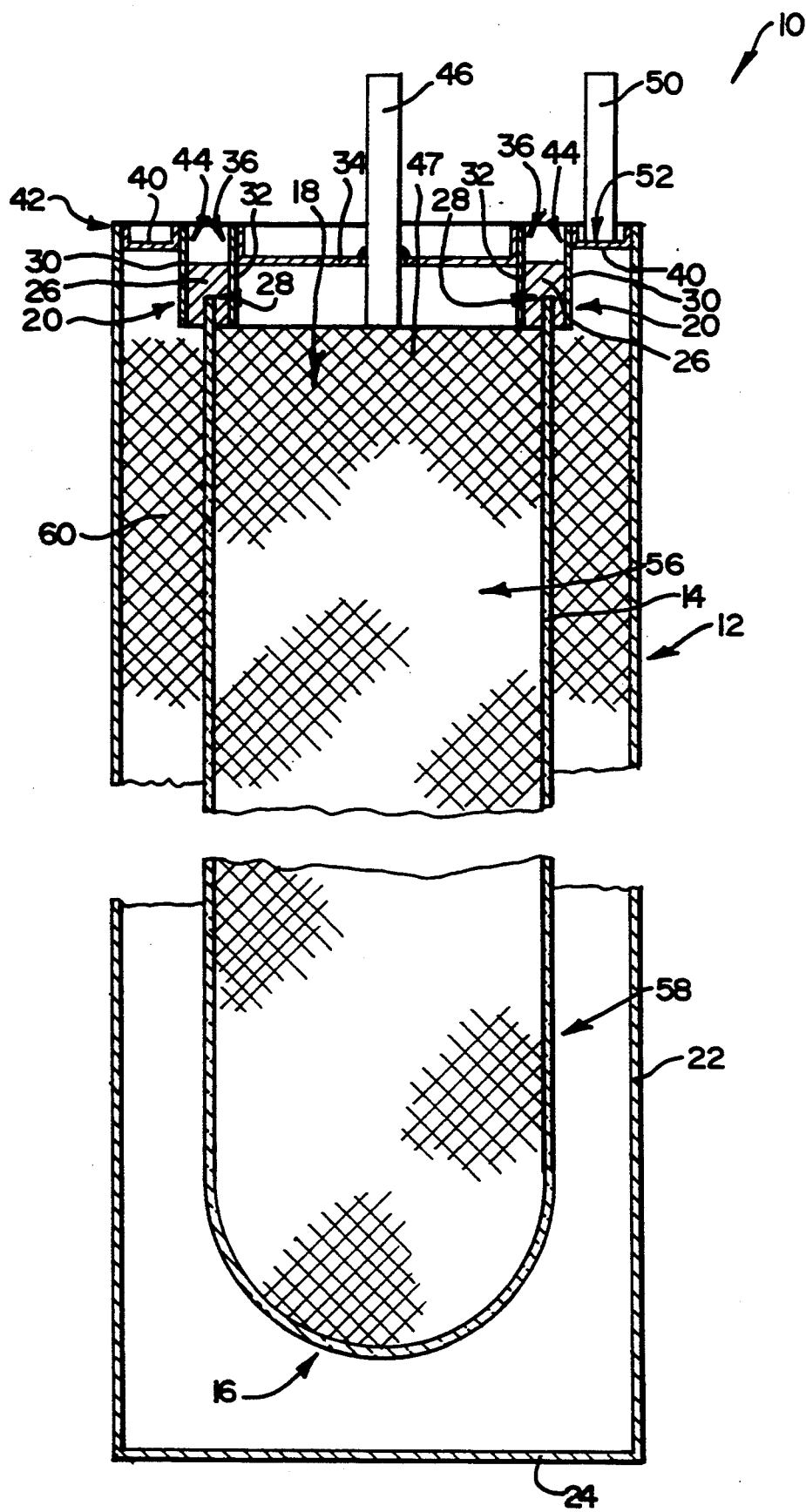
FIG. 1 shows a schematic sectional side elevation of an electrochemical cell, in accordance with the present invention.

Referring to FIG. 1, reference numeral 10 generally indicates an electrochemical cell in accordance with the invention.

The cell 10 includes an outer cylindrical casing 12 having a side wall 22 connected to a circular floor 24; a beta-alumina tube 14 located concentrically within the casing 12, the tube 14 being closed at its one end 16 and open at its other end 18; and a collar assembly 20 around the end 18 of the tube 14. The collar assembly 20 comprises a circular insulating ring 26 of alpha-alumina, with the end 18 of the tube 14 mounted to the ring 26 by being sealingly located in an annular groove 28 in the ring and being sealed thereto by thermo-compression bonding or by a compression seal. Two concentric truncated cylinders of nickel, designated 30, 32, are bonded fluid tightly to the outer and inner curved surfaces respectively of the ring 26. An annular closure disc 34 closes off the open end 18 of the tube 14, the disc 34 being secured to the truncated cylinder or ring 32 at 36. An annular disc 40 also closes off the end of the casing 12 remote from the floor 24, the disc 40 being secured, eg welded, to the casing at 42 and to the ring 30 at 44. A steel rod current collector 46 projects into the tube 14, and a steel rod current collector 50 protrudes from the disc 40 at 52. The current collector 46 is electrically connected to a porous wicking layer 47 lining the inside of the separator tube 14, ie in intimate contact with the tube 14, with finely divided electrically conductive particles, eg Ni and/or Fe particles incorporated in the layer.

An anode compartment 56 is, hence, provided inside the tube 14, with a cathode compartment 58 being provided around the outside of the tube 14, within the casing 12, the beta-alumina tube 14 hence constituting a separator between the anode and cathode compartments.

Into the cathode compartment 58, there is placed an electrolyte-permeable matrix 60 of Fe or Ni, with sodium chloride powder incorporated therein in dispersed form. A minor quantity of a chalcogen can also be incorporated therein. For example, when Ni is used the chalcogen can be FeS. Sufficient molten NaAlCl$_4$ electrolyte, either undoped or doped with NaBr as hereinafter described, is then added to the cathode compartment so that the matrix is impregnated with the electrolyte and the electrolyte wets the separator or tube 14. Instead, when the cell is doped with NaBr, the NaBr can be in finely divided particulate form and be dispersed throughout the matrix, eg by being dispersed in the particulate material from which the matrix is formed, prior to formation of the matrix. The beta-alumina tube 14 thus forms a continuous barrier between the electrolyte containing cathode compartment 58 and the anode compartment 56, within the housing 12. Initially, the layer 47 ensures the required electrical contact between the collector 46 and the separator 16. However, on the first sodium passing through the separator it 'wicks' along the layer 47 thereby providing further electrical contact between the anode compartment and the separator.

On charging the cell 10, the following reaction takes place in the cathode compartment:

$$2NaCl + Fe \rightarrow 2Na + FeCl_2 \qquad (2\ A)$$

$$2NaCl + Ni \rightarrow 2Na + NiCl_2 \quad (2B)$$

The Na generated by the reactions passes through the beta-alumina into the anode compartment. A small amount of starting Na can be provided in the anode compartment, in molten form, to connect the current collector 46 to the separator 14.

A series of tests were conducted with cells in accordance with the invention and being similar to that of FIG. 1.

The cells of Examples 1 to 6 had Ni cathodes or positive electrodes, while the cells of Example 7 had Fe cathodes or positive electrodes.

In the tests described in Examples 1 to 7 hereunder, 6 mole % (based on the electrolyte) NaBr was added as dopant to the electrolyte before assembly, as hereinbefore described, as was a small proportion of FeS and NaF. In Example 7, however, in which a Fe cathode was used, the FeS dopant was omitted. For comparative tests, similar cells were used, but without the NaBr dopant. These have been identified as 'Standard Cells'. Similar cells were connected in strings of 5 or less and cycled together according to the individual experimental requirements. The test cells either had thermo compression bonded ('TCB') seals (Examples 1 to 3) or compression ring seals (Examples 4 to 7). Coulometric cycling was regulated by means of ampere-hour meters, which accumulated the charging current during each cycle at a constant charge limit of 2.75 V. Due to temperature variances they exhibited a drift in accuracy and since they were used in both the up and down mode without automatic resetting the error was accumulated. Regular re-calibration was required to maintain the desired capacity, but some fluctuation thereof still resulted.

EXAMPLE 1

Accelerated testing

Figure 2:
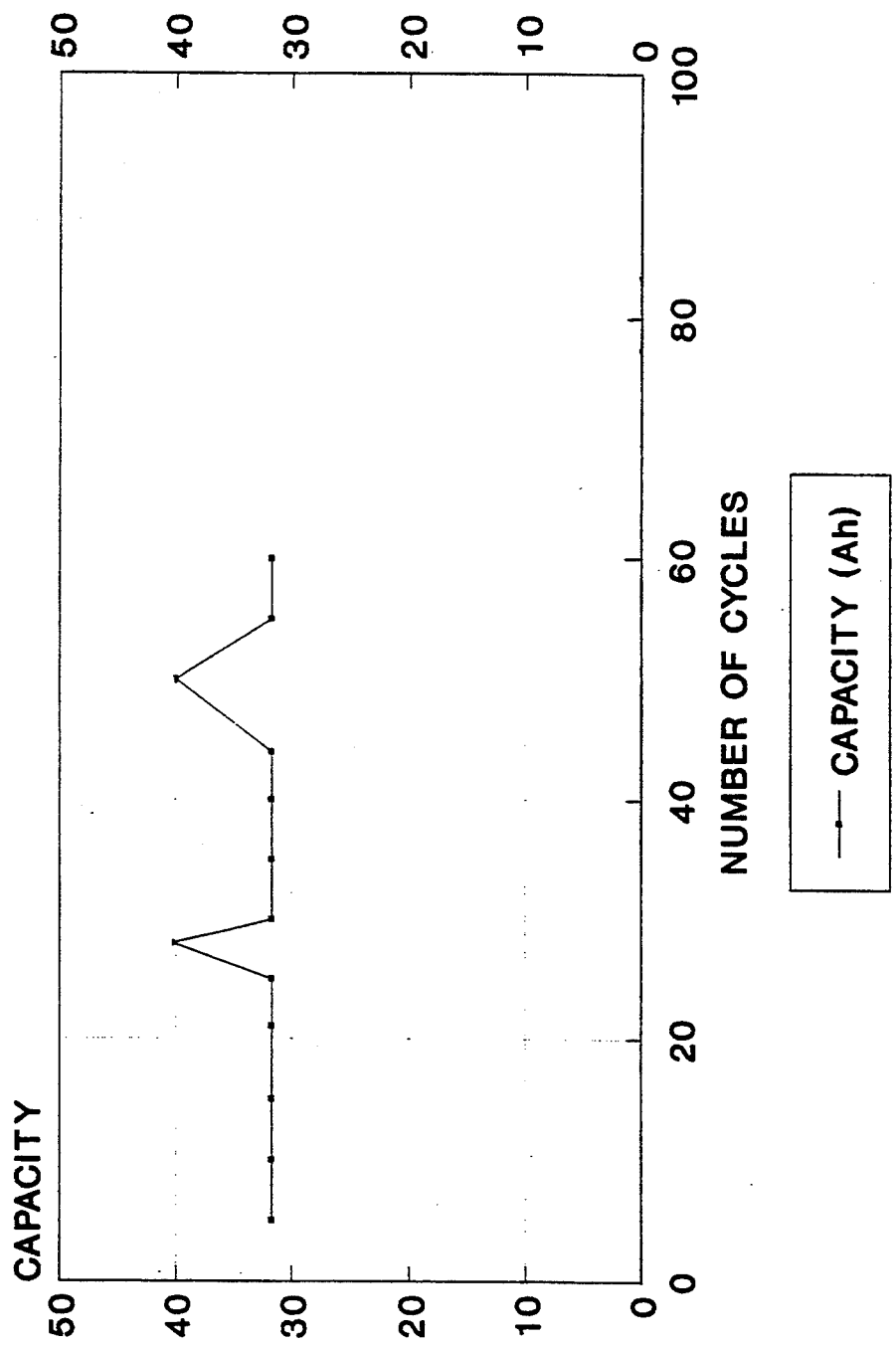
FIGS. 2 to 15 show plots of results obtained on test cells in accordance with the invention.
Figure 3:
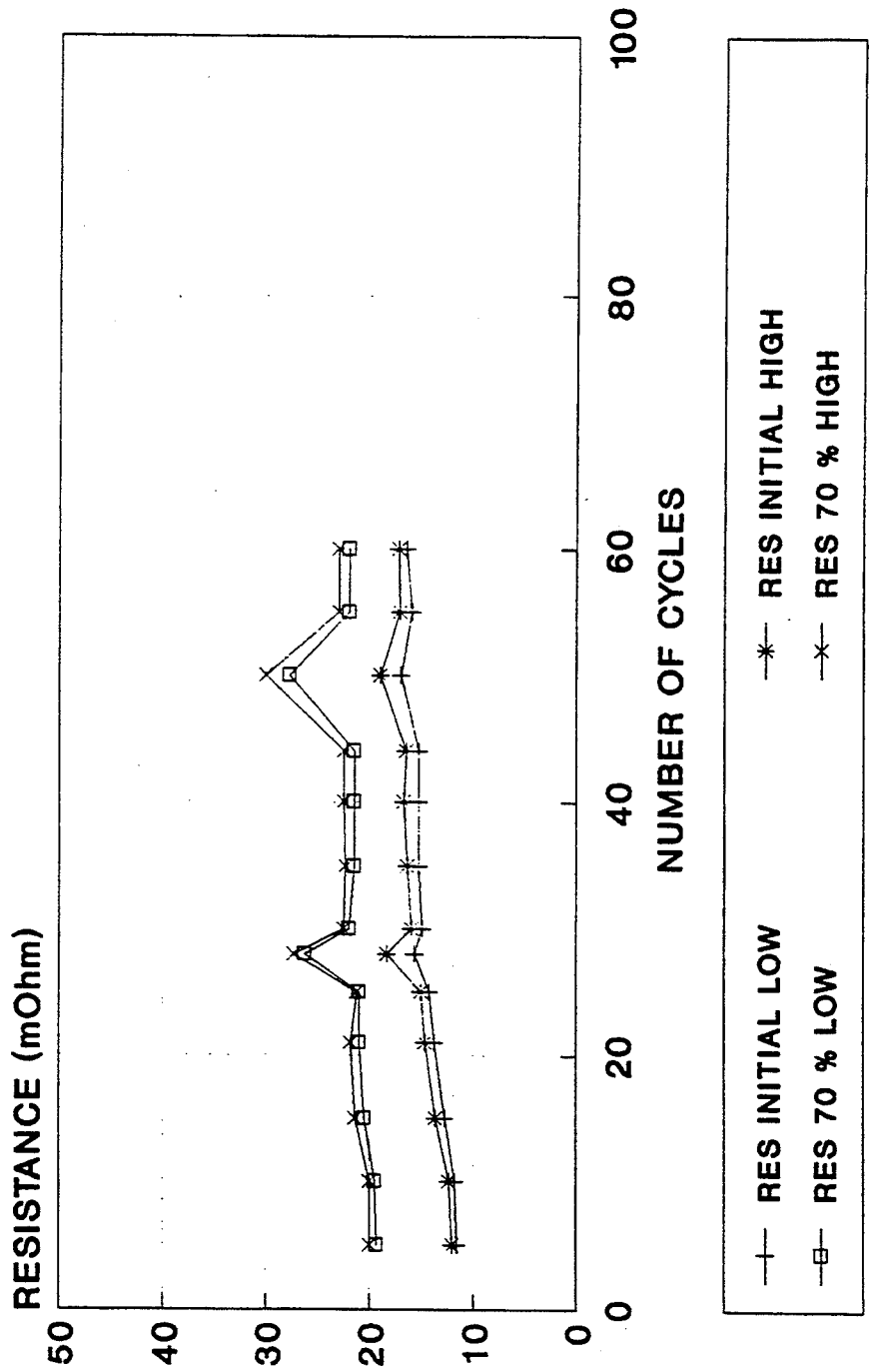

Test parameters:
31.7 Ah; 30 A discharge; temperature 300°-350° C. on discharge; stopped for 2 hours; 2.8 V upper, 1.0 lower trip; 3 cells arranged in series.
Results:
Capacity after 60 cycles—31.7 Ah (nominal 40 Ah). Initial Resistance ('R')—12 mΩ after 5 cycles; 16 to 17 mΩ after 60 cycles. R at 21 Ah—20 mΩ after 5 cycles; 22 mΩ after 60 cycles.
The results of these tests are also indicated in FIGS. 2 and 3 (Accelerated cycling: 2.5 A charge to 2.8 volts; 30 A discharge to 1.0 volt; batch of 3 cells (TCB); graph peak corresponds to nominal capacity check cycle at 8 A discharge).

EXAMPLE 2

Overtemperature

Figure 4:
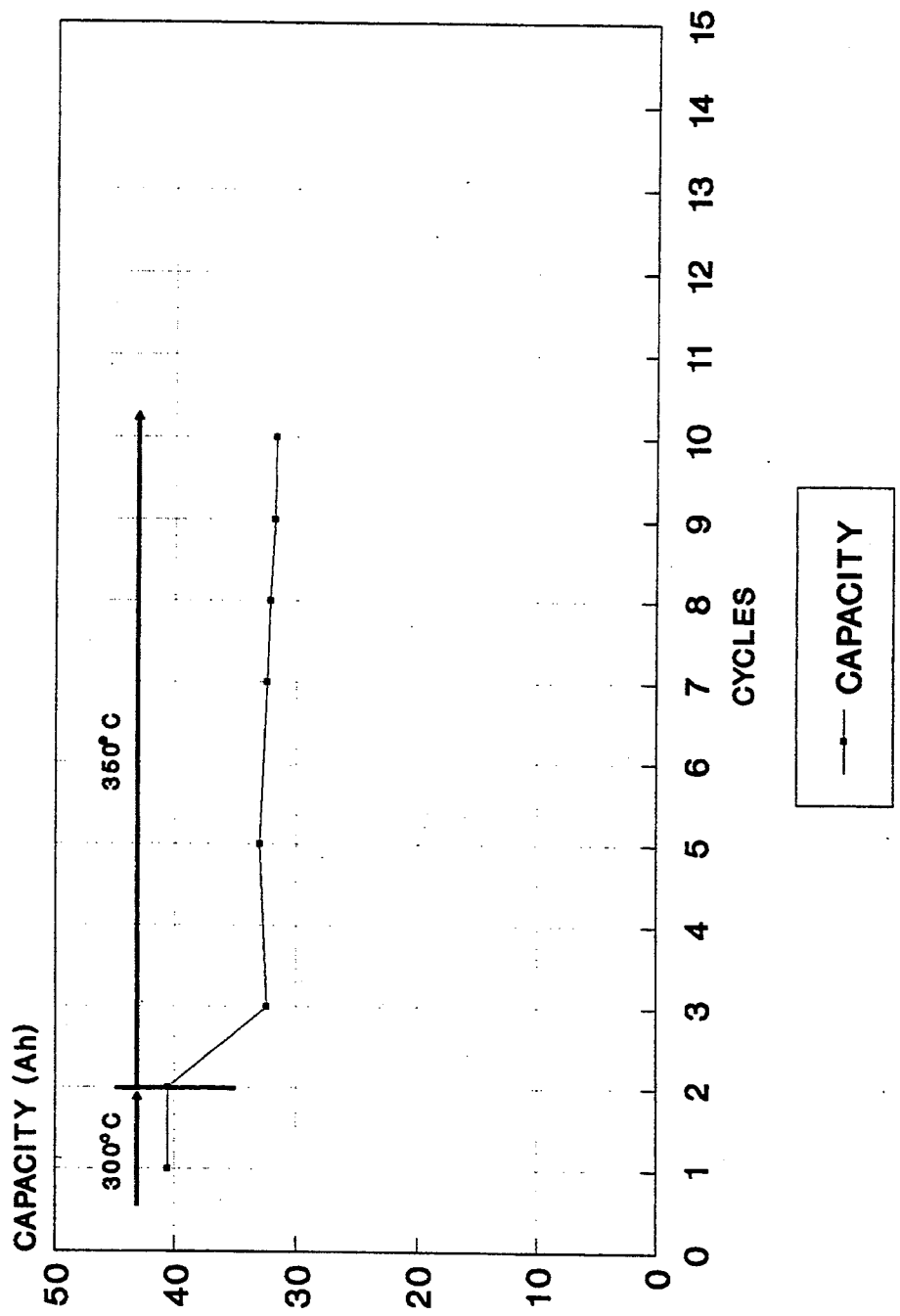
Figure 5:
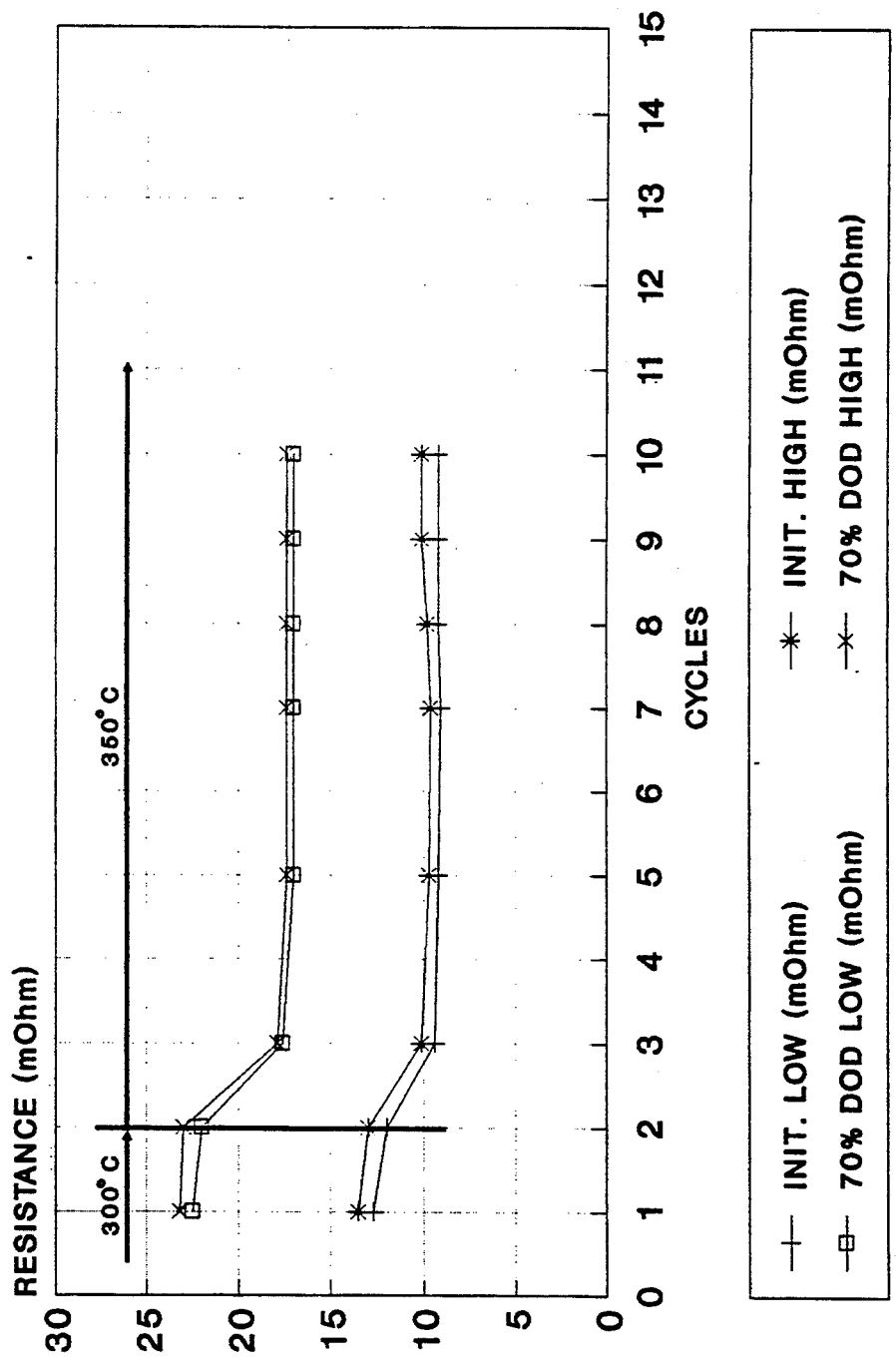

Test parameters:
Temperature 350° C.; normal cycling 30 A discharge, 4 A charge; Trips: 2.72 V and 1.80 V; 4 cells arranged in series.
Results:
Capacity after 10 cycles—31.7 Ah (nominal 40.5 Ah). Initial R—9.4–10.1 mΩ after 3 cycles; 9.2–10.1 mΩ after 10 cycles. R at 21 Ah—17.6–17.9 mΩ after 3 cycles; 17.0–17.4 mΩ after 10 cycles.
The results of these tests are indicated in FIGS. 4 and 5 (High temperature cycling; 4 AMP charge to 2.72 volts; 30 AMP discharge to 1.80 volts; batch of 4 cells).

EXAMPLE 3

Taper Charging

Figure 6:
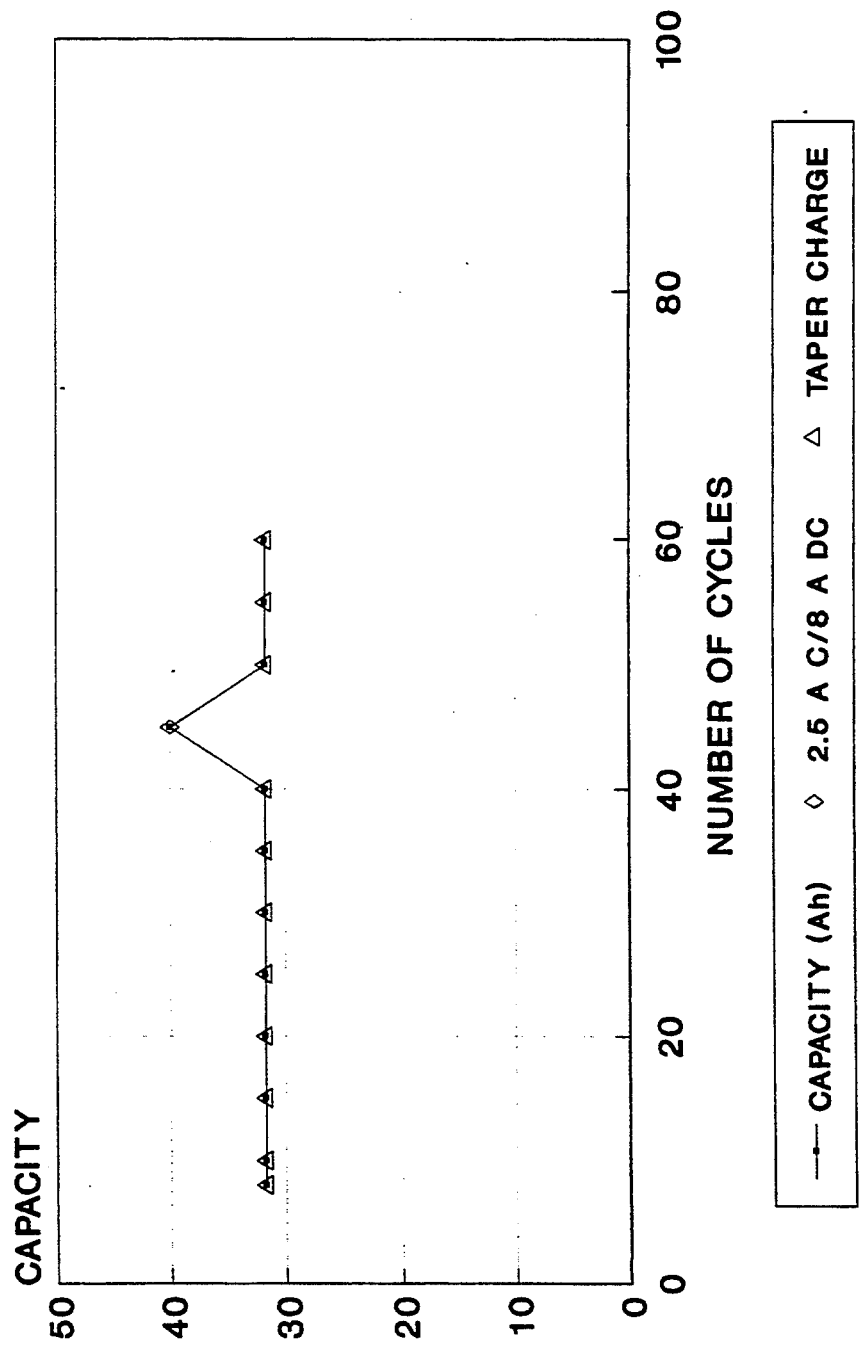
Figure 7:
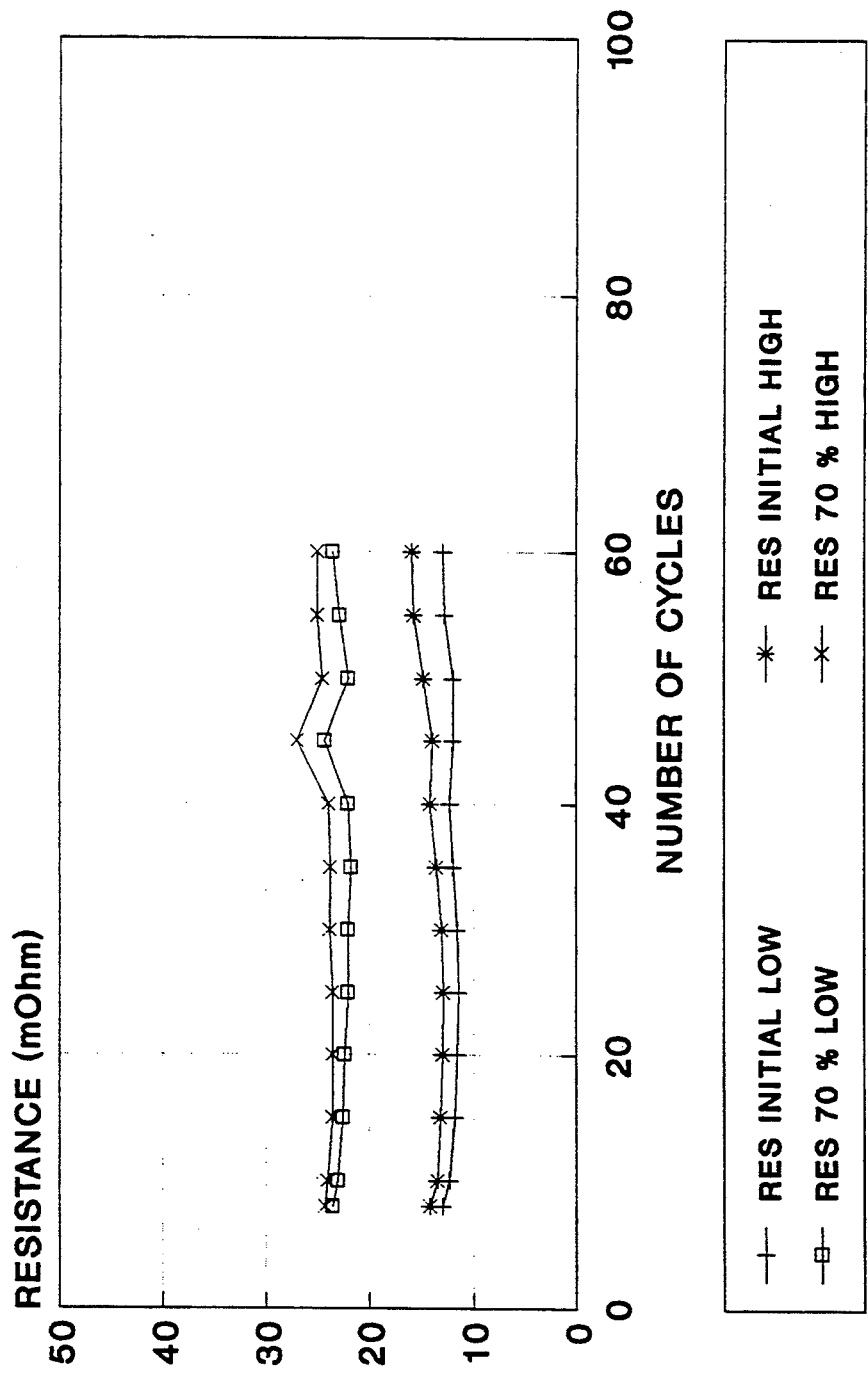

Test Parameters:
30 A discharge; constant voltage ('V') charge (2.75); initial charge current 15 A; 31.7 Ah capacity (for comparison with Example 1); 4 cells arranged in series.
Results:
Capacity after 60 cycles—31.7 Ah (nominal 40 Ah). Initial R—12–13 mΩ after 5 cycles; 13–16 mΩ after 60 cycles. R at 21 Ah—23–24 mΩ after 5 cycles; 23.5–25 Ω after 60 cycles.
The results of these tests are shown in FIGS. 6 and 7 (Taper charging: taper charge (constant voltage 2.75 V); 30 A discharge to 1.0 volt; batch of 4 cells (TCB); graph peak corresponds to nominal capacity check cycle at 8 A discharge.

EXAMPLE 4

Coulometric Cycling:

A. NaBr Doped Cells:

Test Parameters:
Constant V (2.75) charging; initial charge current 10 A; discharge current 8 A; 33 Ah capacity. 5 cells arranged in series.
Results:
Capacity after 90 cycles—33 Ah (nominal 40 Ah). Initial R—12 mΩ after 5 cycles; 14 mΩ after 90 cycles. R at 21 Ah—21 mΩ after 5 cycles; 27 mΩ after 90 cycles.

Figure 8:
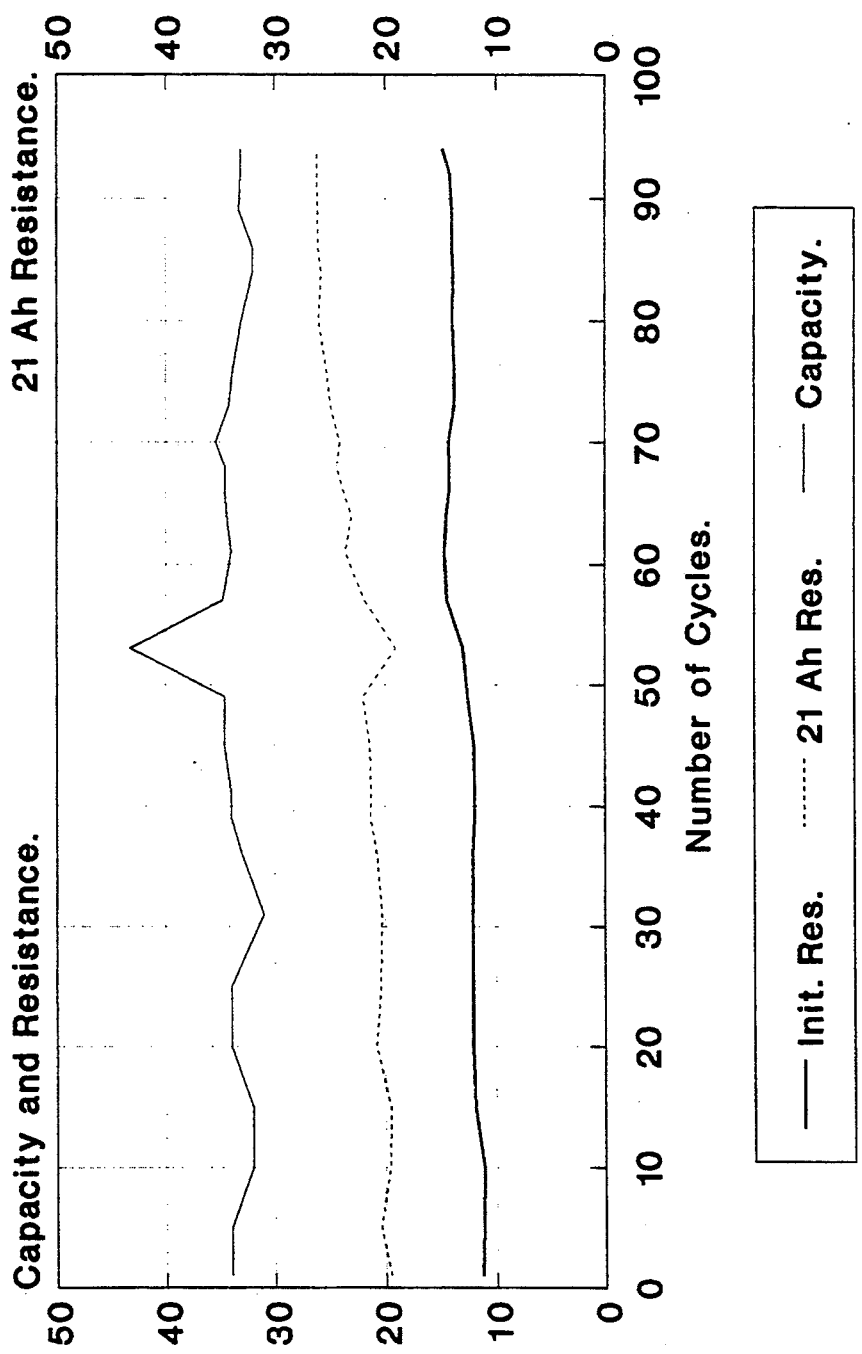
Figure 9:
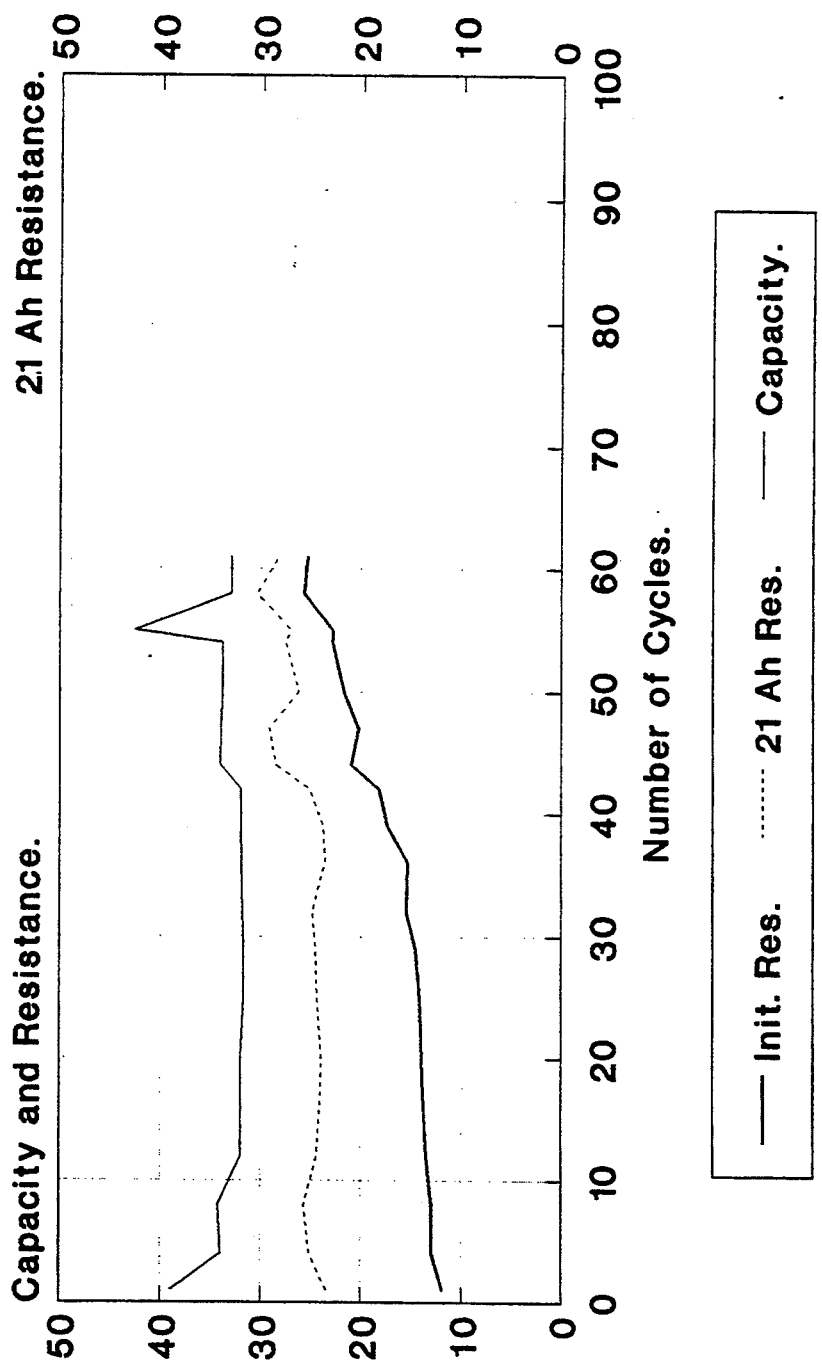

B. Standard Production Cells:

Test Parameters:
5 cells arranged in series; other's parameters as for NaBr doped cells.
Results:
Capacity after 60 cycles—33 Ah (nominal 40 Ah). Initial R—13 mΩ after 5 cycles; 26 mΩ after 60 cycles. R at 21 Ah—26 mΩ after 5 cycles; 29 mΩ after 60 cycles.
The results of these tests are shown in FIGS. 8 and 9 (Cycling temperature=300° C.; capacity fluctuation due to instrumental drift (recalibrated every 15 cycles); constant voltage charging; upper voltage limit: 2.75 V; discharge current 8 A).

EXAMPLE 5

Overcharging to 41 Ah:

A. NaBr Doped Cells:

Test Parameters:
5 cells arranged in series; other parameters as set out in Example 4.
Results:
Capacity after 60 cycles—41 Ah (nominal 40 Ah). Initial R—12–13 mΩ after 5 cycles; 14–28 mΩ after 60 cycles. R at 21 Ah—21–28 mΩ after 5 cycles; 20–29 mΩ after 60 cycles.

B. Standard Production Cells:

Test Parameters:
5 cells arranged in series; other parameters as for NaBr doped cells.
Results:
Capacity after 79 cycles—36 Ah (nominal 40 Ah). Initial R—14–16 mΩ after 5 cycles; 23–26 mΩ after 70 cycles. R at 21 Ah—25-27 mΩ after 5 cycles; 25-27 mΩ after 70 cycles.

Figure 10:
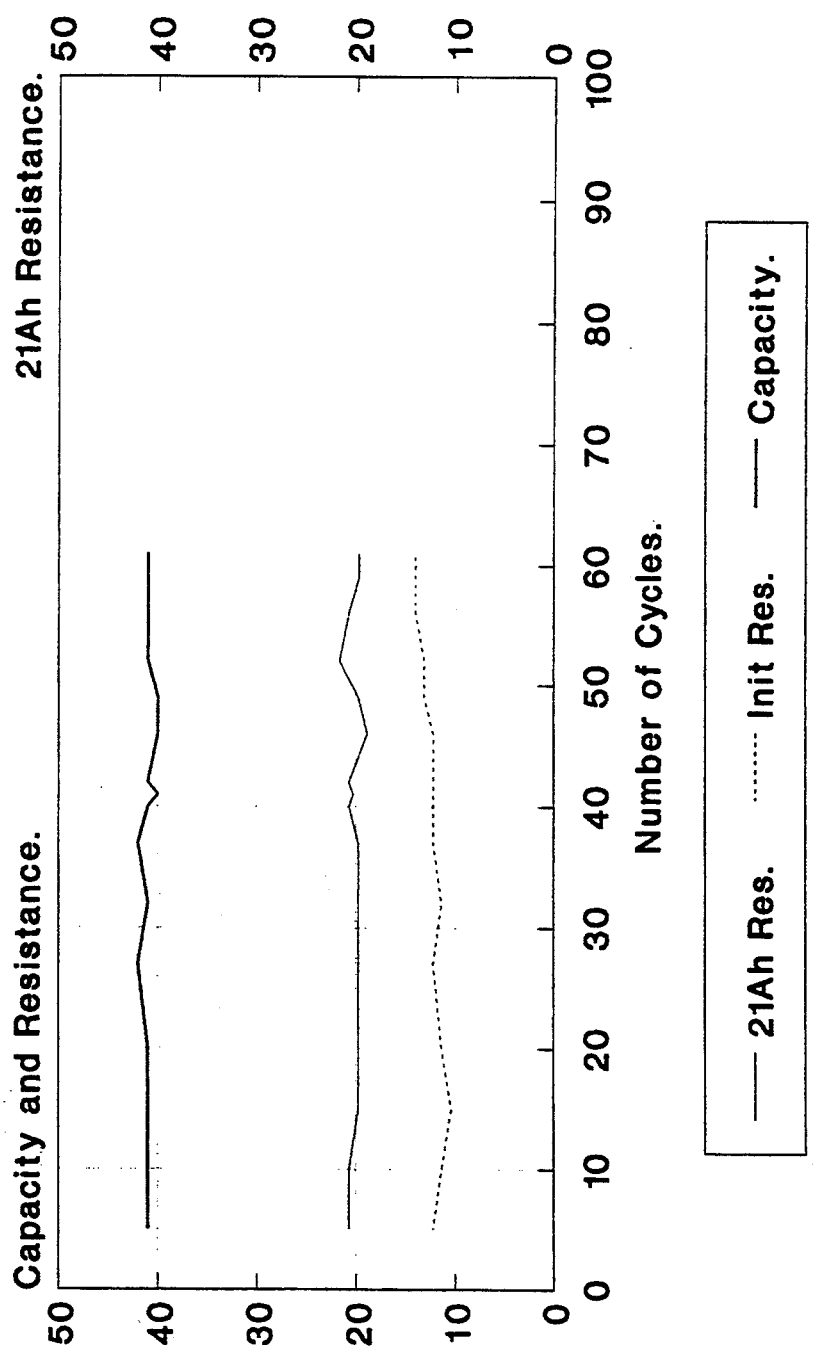
Figure 11:
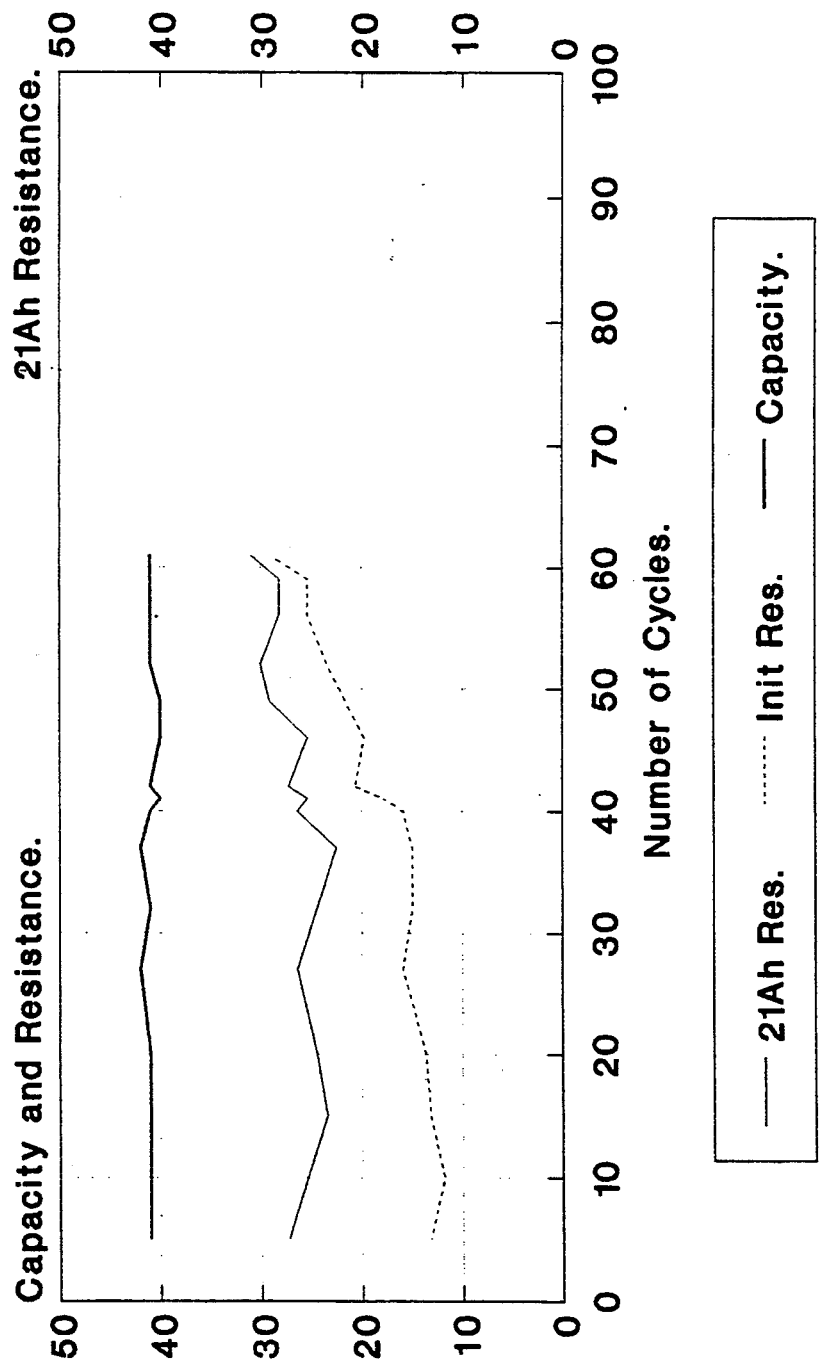
Figure 12:
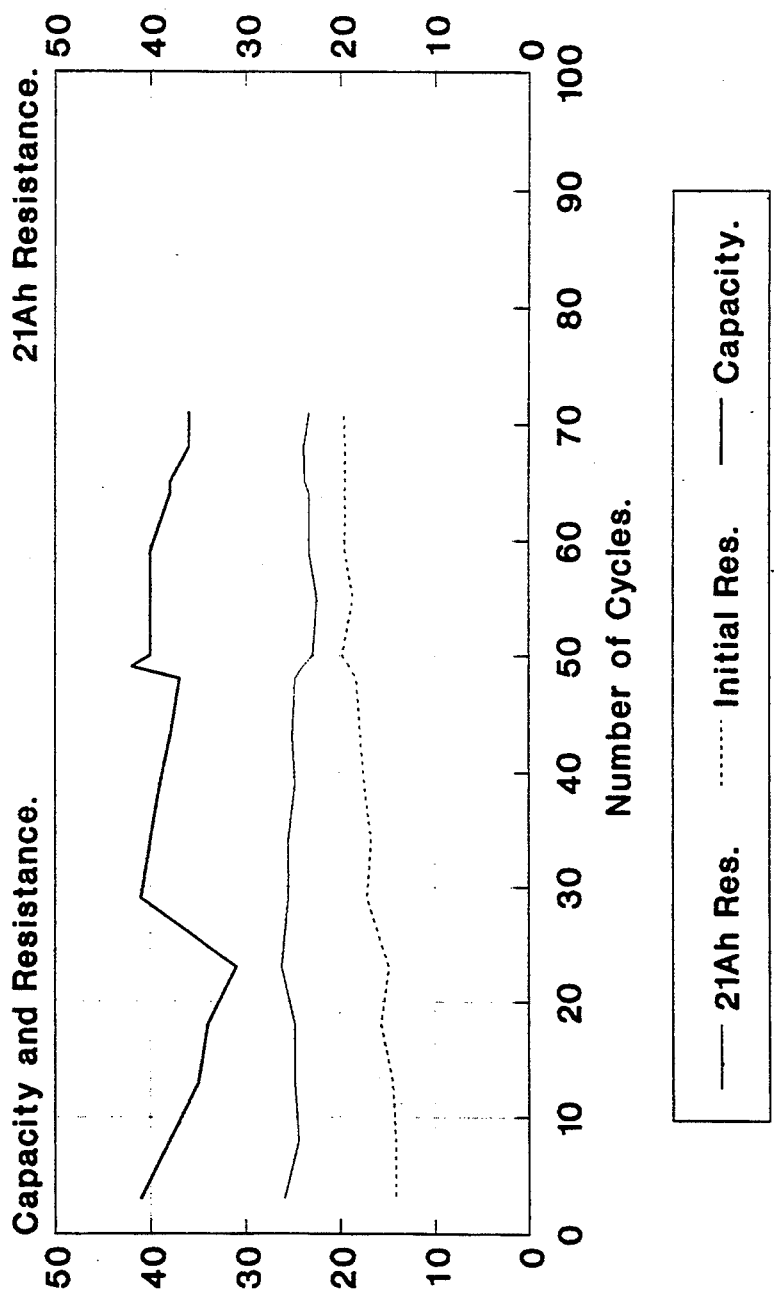
Figure 13:
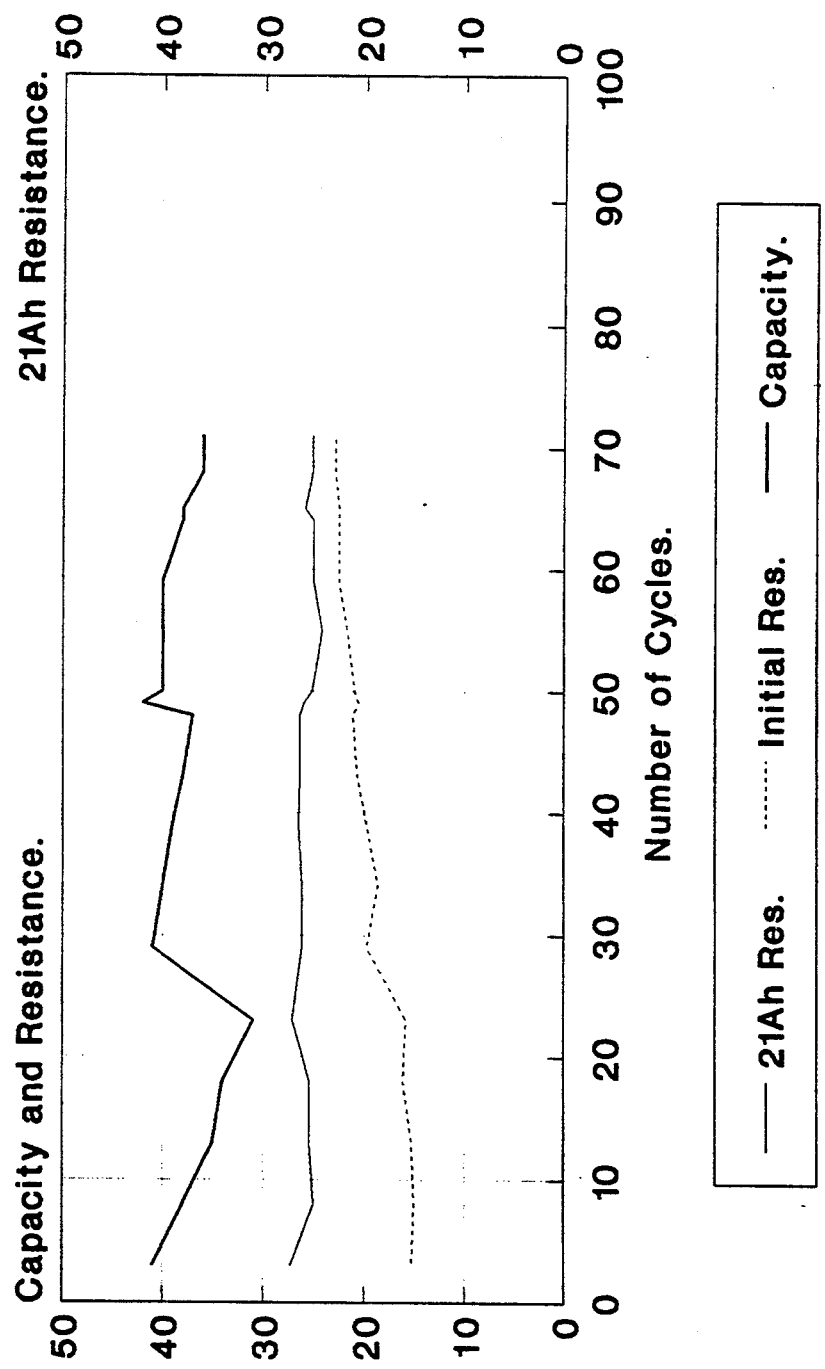

The results of these tests are shown in FIGS. 10, 11, 12 and 13, with FIGS. 10 and 12 showing the best values for the NaBr doped and standard production cells respectively, and FIGS. 11 and 13 showing the mean value for the respective cells (Cycling temperature=300° C.; capacity fluctuation due to instrumental drift (recalibrated every 20 cycles); constant voltage charging at 2.75 V; charge current 2.5 A; discharging current 8 A).

EXAMPLE 6

Overtemperature testing:

Test Parameters:

3 A charge; 30 A discharge; A single cell was subjected to a temperature of 300° C. for 53 cycles at 3 A charge and 30 A discharge; thereafter the temperature was increased to 350° C., and the cell subjected to further charge/discharge cycles. The upper and lower voltage limits were set to 2.72 V and 1.50 V respectively.

Figure 14:
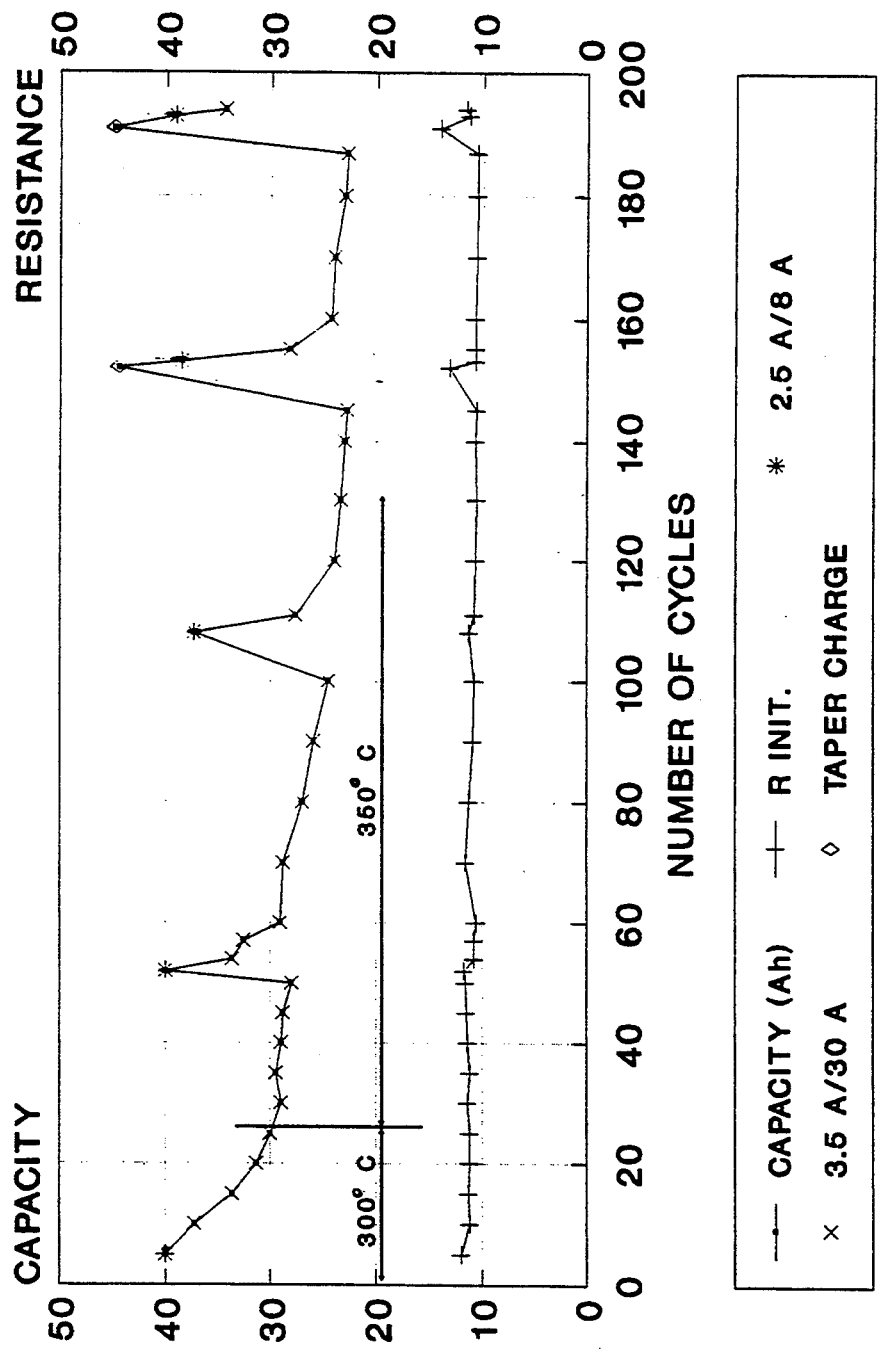

Results:

Over a period of 139 cycles at 350° C., no capacity loss or resistance rise occurred in the cell. The results of the tests are shown in FIG. 14 (Accelerated cycling: 3.6 A charge to 2.74 volts; 30 A discharge to 1.5 volts; one cell (comp. ring seal) graph peak corresponds to nominal capacity check cycle at 8 A discharge).

EXAMPLE 7

Capacity and Resistance Testing:

Test Parameters:

Temperature 265° C.; 3 cells arranged in parallel Theoretical Capacity 20 Ah/cell; 9 A charge; 60 A discharge.

Figure 15:
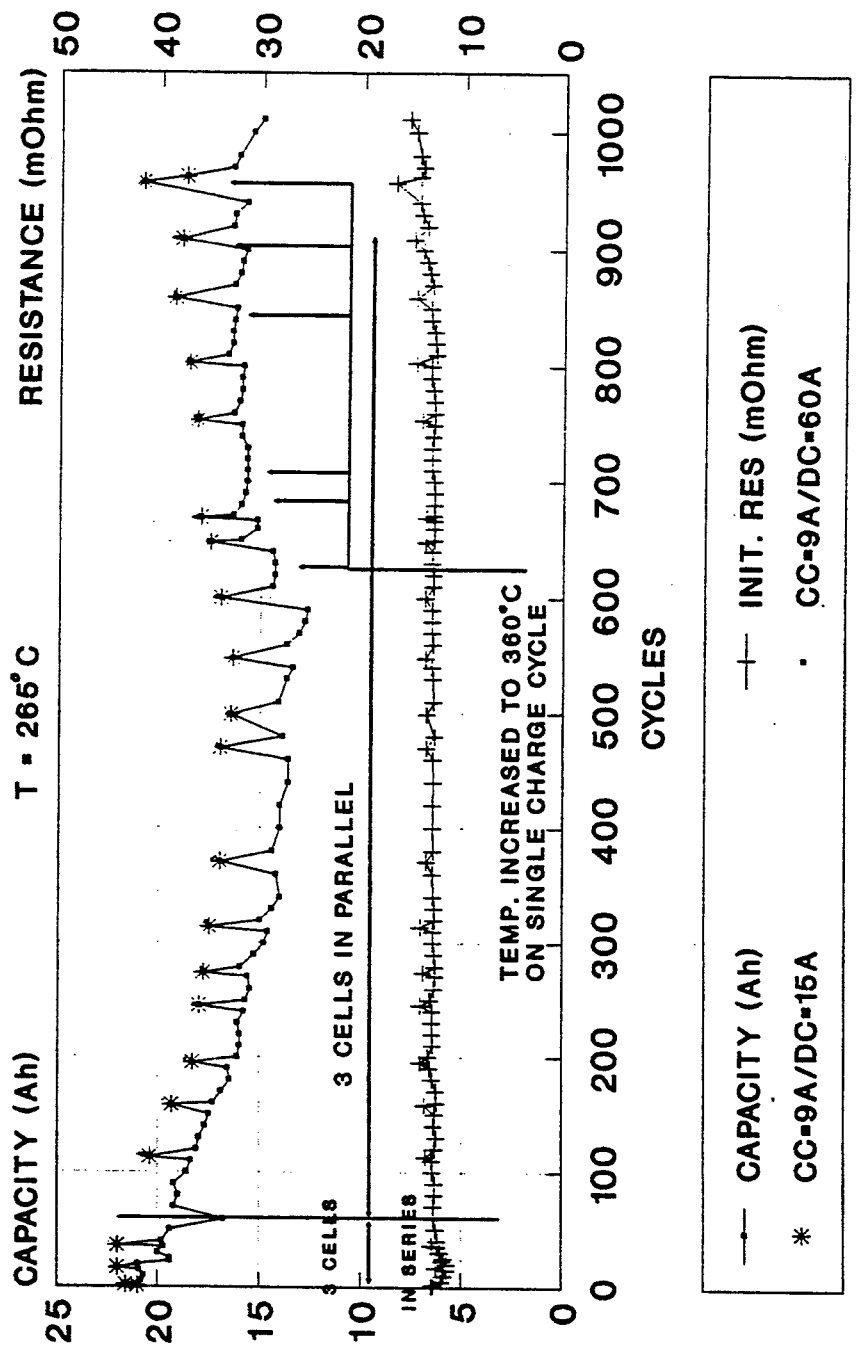

Results:

The string of cells, after cycling for 980 cycles at a 1 hour discharge, 5 hour charge rate, still shows a nominal capacity of 19 Ah/cell out of a possible 20 Ah, with initial resistance of 14.5 milliohm and 18 milliohm at 70% DOD. In other words, the test shows no capacity loss or resistance rise. The results are also set out in FIG. 15 (Sintered granule cathode (carboxy Fe); NaBr-+NaF doped; theoretical capacity=20 Ah./cell).

The presence of NaBr on the cathode side of the cells thus brought about improvement in resistance values compared to undoped cells during the cycles listed hereinbefore.

Generally, the doped cells required no run-in period; they have satisfactory capacity; they exhibit capacity retention after 60 cycles, under accelerated cycling conditions; they show good resistance stability after 60 cycles, on both the accelerated tests and coulometric cycling; and they show good resistance stability after 60 cycles when overcharged to 41 Ah.

We claim:

1. A method of making an electrochemical cell, the method comprising:

loading into a cathode compartment of a cell housing comprising an anode compartment containing at the operating temperature of the cell and when the cell is in its charged state, a molten alkali metal, M, as anode, the anode compartment being separated from the cathode compartment by a separator which is a solid conductor of ions of alkali metal M or is a micromolecular sieve which contains alkali metal M sorbed therein and the cathode compartment having a current collector consisting essentially of only Fe, Ni, Co, Cr, Mn and mixtures thereof, an alkali metal aluminium halide molten salt electrolyte having the formula $MAlHal_4$, wherein M is the alkali metal of the anode and Hal is a halide;

a transition metal T selected from the group consisting of Fe, Ni, Co, Cr, Mn and mixtures thereof as substantially the only active cathode substance;

an alkali metal halide MHal wherein M and Hal are respectively the same alkali metal and halide as in the molten salt electrolyte; and a minor proportion of MBr where M is the same alkali metal as in the molten salt electrolyte, thereby to make an electrochemical cell precursor; and charging the precursor at a temperature at which the molten salt electrolyte and alkali metal M are molten, thereby to halogenate the active cathode substance, with alkali metal being produced and passing through the separator into the anode compartment and with the cathode compartment then containing an electronically conductive electrolyte permeable matrix which has dispersed therein the active cathode substance and which is impregnated with the electrolyte, and the proportions of alkali metal halide MHal, molten salt electrolyte, and MBr loaded into the cathode compartment being selected so that when the cell is fully charged and all the available cathode substance has been halogenated, the proportion of alkali metal ions and aluminium ions is such that the solubility of the active cathode substance in the molten electrolyte is at or near its minimum.

2. A method as claimed in claim 1, wherein the alkali metal, M, is sodium; the separator is beta-alumina; the halide, Hal, is chlorine; and MBr is NaBr.

3. A method as claimed in claim 2, wherein the proportion of NaBr in the molten electrolyte is between 1% and 20% on a molar basis.

4. A method as claimed in claim 3, wherein the proportion of NaBr in the liquid electrolyte is between 2% and 15%.

5. A method as claimed in claim 1, wherein the transition metal T of the active cathode substance is a member of the group consisting of Fe, Ni and mixtures thereof.

6. A method as claimed in claim 1, which includes initially loading also some aluminium into the cathode compartment, with no sodium initially being present in the anode compartment.

7. A method as claimed in claim 1, wherein the active cathode substance is loaded into the cathode compartment in the form of an intermediate refractory hard metal compound of said transition metal T with at least one non-metal of the group consisting of C,Si,B,N and P.

8. A method as claimed in claim 1, wherein the active cathode substance and the alkali metal halide are mixed together in particulate form to form a mixture, the mixture sintered to form the electrolyte-permeable matrix, the electrolyte doped with the MBr, and the matrix impregnated with the doped molten salt electrolyte prior to loading thereof into the cathode department.

9. An electrochemical cell, when made according to the method as claimed in claim 1.

10. A method of making an electrochemical cell precursor, the method comprising:

loading into a cathode compartment of a cell housing comprising an anode compartment containing at the operating temperature of the cell and when the cell is in its charged state, a molten alkali metal, M, as anode, the anode compartment being separated from the cathode compartment by a separator which is a solid conductor of ions of alkali metal M or is a micromolecular sieve which contains alkali metal M sorbed therein and the cathode compartment having a current collector consisting essentially of only Fe, Ni, Co, Cr, Mn and mixtures thereof.

an alkali metal aluminium halide molten salt electrolyte having the formula $MAlHal_4$, wherein M is the alkali metal of the anode and Hal is a halide;

a transition metal T selected from the group consisting of Fe, Ni, Co, Cr, Mn and mixtures thereof as substantially the only active cathode substance;

an alkali metal halide MHal wherein M and Hal are respectively the same alkali metal and halide as in the molten salt electrolyte; and a minor proportion of MBr where M is the same alkali metal as in the molten salt electrolyte, thereby to make an electrochemical cell precursor which, when it is subjected to charging at a temperature at which the molten salt electrolyte and alkali metal M are molten, is transformed into an electrochemical cell in which the active cathode substance is halogenated and alkali metal is produced, with the alkali metal passing through the separator into the anode compartment and with the cathode compartment then containing an electronically conductive electrolyte permeable matrix which has dispersed therein the active cathode substance and which is impregnated with the electrolyte, the proportions of alkali metal halide MHal, molten salt electrolyte, and MBr loaded into the cathode compartment being selected so that when the cell is fully charged and all the available cathode substance has been halogenated, the proportion of alkali metal ions and aluminium ions is such that the solubility of the active cathode substance in the molten electrolyte is at or near its minimum.

11. A method as claimed in claim 10, wherein the alkali metal, M, is sodium; the separator is beta-alumina; the halide, Hal, is chlorine; and MBr is NaBr.

12. A method as claimed in claim 10, wherein the transition metal T of the active cathode substance is a member of the group consisting of Fe, Ni and mixtures thereof.

13. A method as claimed in claim 10, which includes initially loading also some aluminium into the cathode compartment.

14. A method as claimed in claim 10, wherein the active cathode substance is loaded into the cathode compartment in the form of an intermediate refractory hard metal compound of said transition metal T with at least one non-metal of the group consisting of C, Si, B, N, and P.

15. A method as claimed in claim 10, wherein the active cathode substance and the alkali metal halide are mixed together in particulate form to form a mixture, the mixture sintered to form the electrolyte-permeable matrix, the electrolyte doped with the MBr, and the matrix impregnated with the doped molten salt electrolyte prior to loading thereof into the cathode compartment.

16. A precursor to an electrochemical cell, when made according to the method as claimed in claim 10.

17. A precursor for a high temperature electrochemical cell which comprises a cell housing having an anode compartment and a cathode compartment separated from each other by a separator which comprises a solid conductor of ions of an alkali metal M or a micromolecular sieve which contains alkali metal M sorbed therein, the cathode compartment having a current collector consisting essentially of only Fe, Ni, Co, Cr, Mn and mixtures thereof and containing:

an alkali metal aluminium halide molten salt electrolyte having the formula $MAlHal_4$, wherein M is the alkali metal of the separator and Hal is a halide;

a cathode which comprises a transition metal T selected from the group consisting of Fe, Ni, Co, Cr, Mn and mixtures thereof as substantially the only active cathode substance;

an alkali metal halide MHal wherein M is the alkali metal of the separator and Hal is the halide of the molten salt electrolyte; and a minor proportion of MBr wherein M is the alkali of the separator, with the precursor being chargeable at a temperature at which the molten salt electrolyte and alkali metal M are molten to cause the active cathode substance to be halogenated, with alkali metal M being produced and passing through the separator into the anode compartment, and with the proportions of alkali metal halide MHal, MBr and molten salt electrolyte being selected so that when the cell is fully charged and all the available active cathode substance has been halogenated, the proportion of alkali metal ions and aluminium ions in the electrolyte is such that the solubility of the active cathode substance in the molten electrolyte is at or near its minimum.

18. A precursor as claimed in claim 17, wherein the cathode comprises an electronically conductive electrolyte-permeable matrix in which the active cathode substance and alkali metal halide are dispersed, with the matrix being impregnated with the molten salt electrolyte doped with the MBr.

19. A precursor as claimed in claim 17, wherein the active cathode substance, the alkali metal halide and the MBr are in particulate form with the alkali metal halide and MBr being mixed with the active cathode substance, and the mixture being impregnated with the molten salt electrolyte.

* * * * *

UNITED STATES PATENT AND TRADEMARK OFFICE
CERTIFICATE OF CORRECTION

PATENT NO. : 5,403,676
DATED : April 4, 1995
INVENTOR(S) : Johan Coetzer and Isak L. Vick It is certified that error appears in the above-indentified patent and that said Letters Patent is hereby corrected as shown below:

On the title page: Item [73] delete ", South Africa".

Signed and Sealed this

Fifth Day of March, 1996

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO.    :   5,403,676

DATED         :   April 4, 1995

INVENTOR(S)   :   Johan Coetzer and Isak L. Vlok

It is certified that error appears in the above-identified patent and that said Letters Patent is hereby corrected as shown below:

Title page,

On the title page: Item [73] delete ", South Africa".

This certificate supersedes Certificate of Correction issued March 5, 1996.

Signed and Sealed this

Second Day of July, 1996

*Attest:*

BRUCE LEHMAN

*Attesting Officer*   Commissioner of Patents and Trademarks

UNITED STATES PATENT AND TRADEMARK OFFICE
CERTIFICATE OF CORRECTION

PATENT NO.    :    5,403,676

DATED         :    April 4, 1995

INVENTOR(S)   :    Johan Coetzer and Isak L. Vlok

It is certified that error appears in the above-identified patent and that said Letters Patent is hereby corrected as shown below:

On the title page please insert:

--[30] Foreign Application Priority Data
Oct. 24, 1990 [GB] Great Britian.....9023140.8--

Signed and Sealed this

Twentieth Day of May, 1997

Attest:

BRUCE LEHMAN

Attesting Officer       Commissioner of Patents and Trademarks